Figure 2:
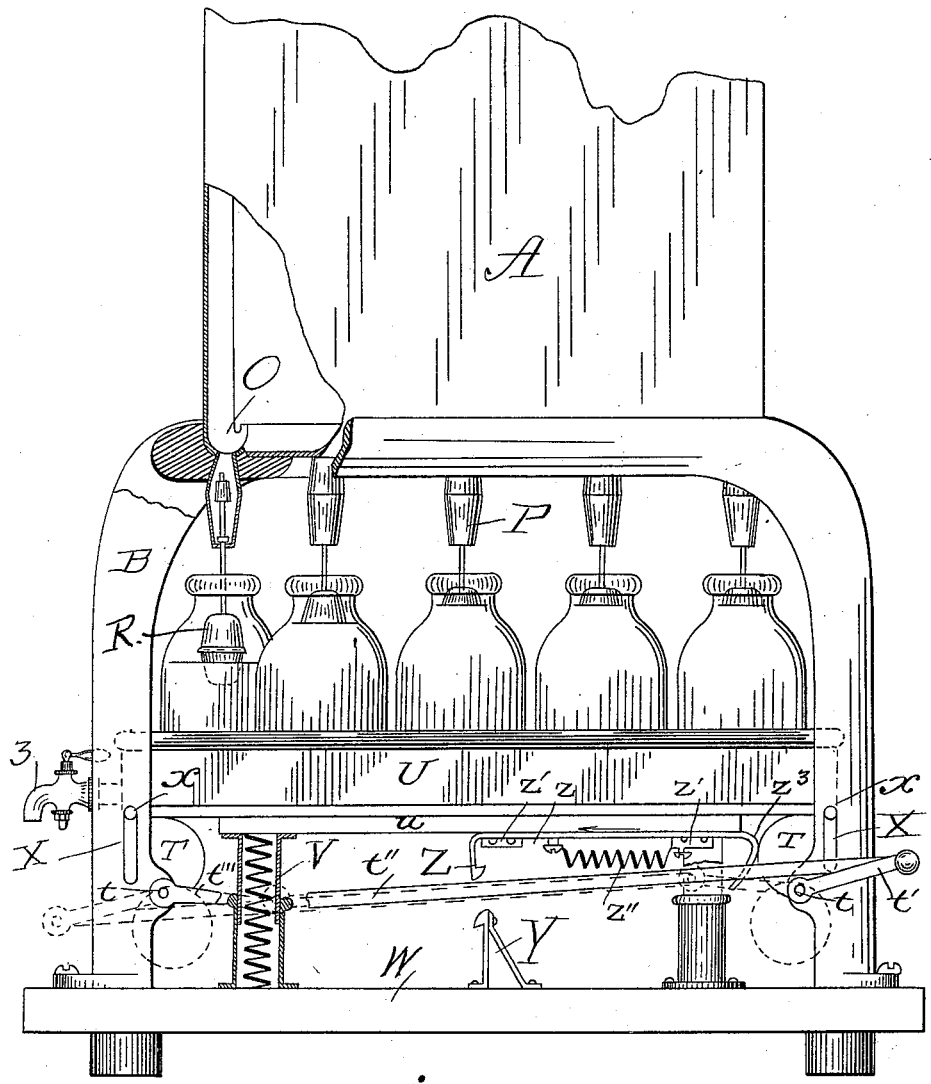

(No Model.) 2 Sheets—Sheet 1.
W. A. CLARK.
MACHINE FOR BOTTLING MILK.
No. 518,306. Patented Apr. 17, 1894.
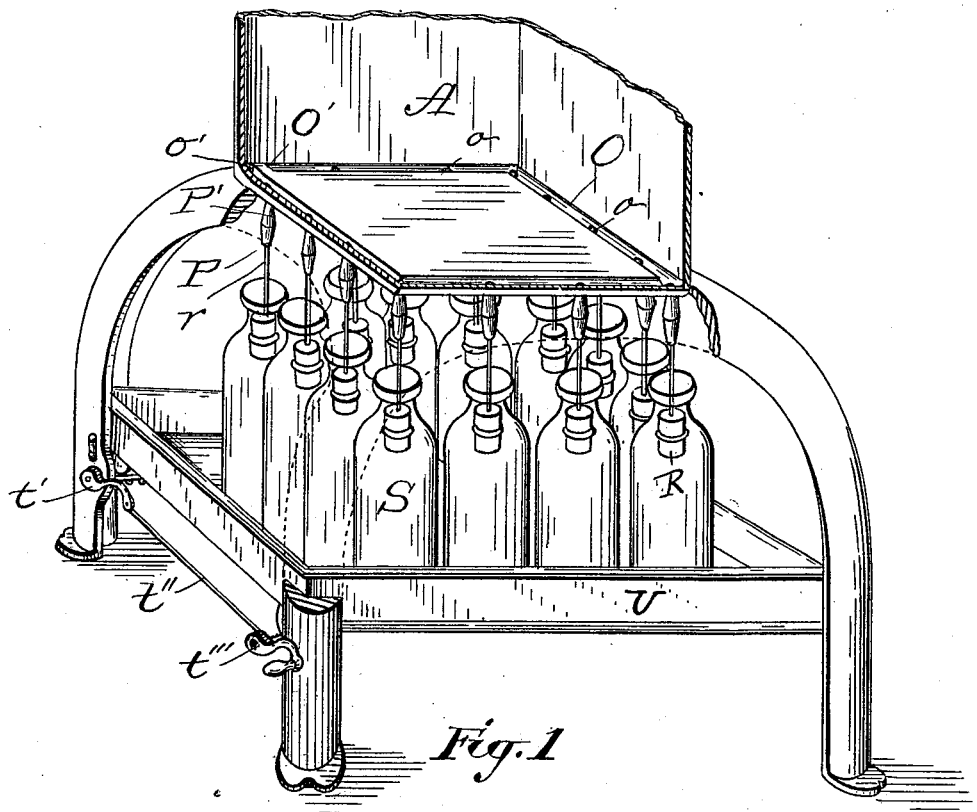
Fig. 1
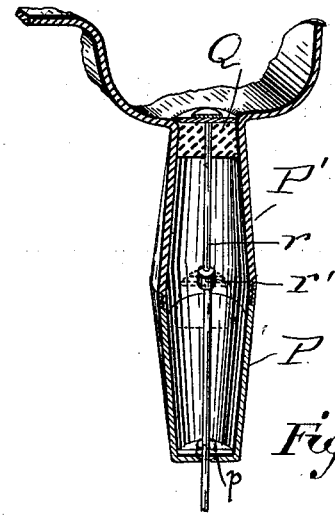
Fig. 2ª
Witnesses
L. H. Young
E. R. Case
Inventor
W. A. Clark
by Fetherstonhaugh & Co
Attys
THE NATIONAL LITHOGRAPHING COMPANY,
WASHINGTON, D. C.

(No Model.)  2 Sheets—Sheet 2.

W. A. CLARK.
MACHINE FOR BOTTLING MILK.

No. 518,306. Patented Apr. 17, 1894.

Witnesses.
Inventor.

ED STATES PATENT OFFICE.

WILLIAM ALBERT CLARK, OF TORONTO, CANADA.

MACHINE FOR BOTTLING MILK.

SPECIFICATION forming part of Letters Patent No. 518,306, dated April 17, 1894.

Application filed May 5, 1893. Serial No. 473,121. (No model.)

*To all whom it may concern:*

Be it known that I, WILLIAM ALBERT CLARK, merchant, of the city of Toronto, in the county of York, in the Province of Ontario, Canada, have invented certain new and useful Improvements in Machines for Bottling Milk, of which the following is a specification.

The object of the invention is to design an apparatus whereby milk may be expeditiously bottled ready for use, after aeration and cooling and it consists of a simple arrangement of receiving chamber and a series of bottling devices hereinafter more particularly explained.

Figure 1, is a sectional perspective view of my apparatus. Fig. 2, is a side elevation of portion of my apparatus parts being broken away and partially in section. Fig. 2$^a$, is a detail of the filling spout and stopper.

A, is a rectangular casing supported on the legs, B and receives the milk to be bottled preferably after it has been aerated and cooled. The casing A which receives the milk has a bottom formed with a channel O, which extends around two sides of the bottom, O', as shown and is slightly inclined throughout its length, so as to cause the milk to gradually flow along it.

o, is a series of holes which is made throughout the length of the channel, O, as shown in Fig. 1. The upper end of the incline of the channel, O, starts from the side of the bottom, O', while the lower end abuts the ridge, o'.

P, is a series of spouts extending downwardly from the holes o, and secured to the bottom, O'. The spouts, P, are formed in two parts, P, P', the lower portion being screwed to the upper portion at or near the center and the upper and lower portions tapered both ways from the center.

Q, is a stopper made preferably of rubber, which is tapered to correspond with the upper portion of the spout. The stopper, Q, has a central spindle, r, to the bottom end of which is attached the float, R.

r', is a collar secured to or forming part of the central spindle, r. When the stopper, Q, is forced to the upper end of the spout by the float the spout is closed, and the collar, r', is situated about midway between the bottom and top of the spout. When, however, the bottle is started to be filled the stopper is in the position shown by dotted lines in Fig. 2$^a$, and the collar rests upon the cross bar, p, attached to or forming part of the lower end of the spout, P.

S, are the bottles which are designed to receive the milk.

T, are round rollers which are eccentrically connected to the pivot rods, t, as shown.

t', are cranks which are connected together by the rod, t''. One of the cranks is provided with a handle, t'''.

V, are telescopic standards one end of which is secured to the bottom bar, u, of the pan, U, while the bottom end is secured upon the base board, W. I provide four such standards so as to equally act upon the pan, U.

x, are pins extending out from the sides of the pan, U, and fitting into the slots, X. The slots, X, it will thus be seen control the upward and downward movement of the pan, U.

Y, is a hooked catch which extends upwardly from the base board, W, and, Z, is an engaging catch secured on the end of the bar, z, which is adjustable lengthwise within the guides, z'.

z'', is a spiral spring attached at one end to the bar, z, and at the other end to one of the guides.

It will thus be seen that the catch, Z, will always be held so that the top end is against the end guides, z'. The other end of the bar, z, is provided with a cam arm, z$^3$. The catch, Z, is intended when the pin is brought down to engage with the catch, Y, and hold the pin in such position during the period that the bottles are being removed. In the position shown in Figs. 1 and 2, it will be seen that as the rods, t, are at the bottom of the rollers that the pan, U, which they support is raised to its utmost limit so as to bring the bottle in position beneath the spouts, P. By turning the crank, t''', in the direction indicated by arrow both of the rollers are thrown to the bottom of the pivoted rods, t, as indicated by dotted lines in Fig. 2. The bottles being now full the weight of the same will overcome the resistance of the spiral springs, V, which are only of sufficient strength to support the pan U, with the empty bottles, and the pan, U, with the bottles will drop so that the catch, Z, will engage with the catch, Y, when the bottles may be removed and empty ones substituted in their stead. The bottles are sufficiently far down so that when they are being taken out they may be readily passed underneath the floats R, without interfering with the same. When the rollers, T, are brought upwardly again it will be seen that the roller on the right hand side of Fig. 2, will come in contact with the cam arm, $z^3$, thereby pushing the bar, $z$, in the direction indicated by arrow and freeing the catch, Z, from the catch, Y, which will permit of the springs in the telescopic standards, V, to assist in the raising of the pan, U.

3, is a faucet extending out from the side of the pan, U, and designed also to drain such pan of any milk which may happen to accumulate in the same.

The milk will first pass through the holes, $o$, near the upper end of the channel, O, and then to the next one and so on until it reaches the end hole at the lower end and in so passing along the channel, O, it will serve to fill the bottles, S, placed beneath the openings $o$. As the incline of the channel, O, is very slight and the downfall of the milk gradual the bottles will be filled one after another, this depending of course upon the position of the holes in the slope of the channel. I provide spouts, P, and stoppers, Q, with floats, R, on their spindles, $r$, for each of the holes, $o$. As each bottle is filled the milk when it comes to a certain level in the bottle will cause the float to rise and force the stopper, Q, into the tapered upper portion of the spout and close it. Should there not be enough milk to fill all the bottles the float of the last one filled or partially filled may be forced upwardly by the attendant, so as to close the spout and the bottles that are filled may be lowered in manner hereinbefore explained and removed from the supporting pan, U. These bottles of course may be each placed in position so as to be filled and have mixed milk in them or they may be withdrawn.

It is of course to be presumed in this description that the receptacle, will hold as much milk as can possibly be obtained from a cow. I find in practice that it will take from six to a dozen bottles to hold all the milk that can be procured from the best of cows. As a general rule, however, eight is about the average and it will be seen that I have provided for the filling of the eight bottles.

Should it be desired not to fill any particular bottle or bottles the stopper, Q, may be pushed up into the top of the spout firmly enough to prevent any milk flowing through this particular spout.

What I claim as my invention is—

1. In combination with a receptacle containing the milk a series of bottles beneath, a series of openings in the bottom of said milk receptacle, spouts leading from each of said openings, floats in each of said bottles, stems connected to said floats and stoppers within the spouts connected to the opposite end of said stems, substantially as described.

2. In an apparatus such as specified, the combination with the channel and spouts and stoppers for each spout, of a pan or receptacle, U, for supporting the bottles and adjusting rollers T, the spindles, $t$, and the cranks, connected together by the rod, $t''$, as and for the purpose specified.

3. In an apparatus such as specified, the combination with the channel and spouts and stoppers for each spout, of a pan or receptacle, U, for supporting the bottles and adjusting rollers T, the spindles, $t$, the cranks, the rod, $t''$, and the spiral spring, $v$, extending between the bottom board of the pan, U, and the base board, W, as and for the purpose specified.

4. In an apparatus such as specified, the combination with the channel and spouts and stoppers for each spout, of a pan or receptacle, U, for supporting the bottles and adjusting rollers, T, the spindles $t$, crank $t'$ the rod, $t''$, the spiral springs, and the telescopic standards, V, surrounding the springs as and for the purpose specified.

5. In combination with the milk filling apparatus of a pan or receptacle U, the pins $x$ extending into slots, the adjusting rollers T, spindles $t$, cranks $t'$, the rods $t''$, springs $v$, telescopic standards V and means for securing the pan in position when lowered, substantially as described.

6. In combination, a pan U, the pins $x$ extending into slots, spindles $t$, crank $t'$ the rods $t''$, springs $v$, telescopic standards V, the spring catch Z, the catch Y, the roller T and the cam arm $z^3$ substantially as described.

WILLIAM ALBERT CLARK.

Witnesses:
B. BOYD,
H. G. S. YOUNG.